Figures 1, 2, 3, 4:
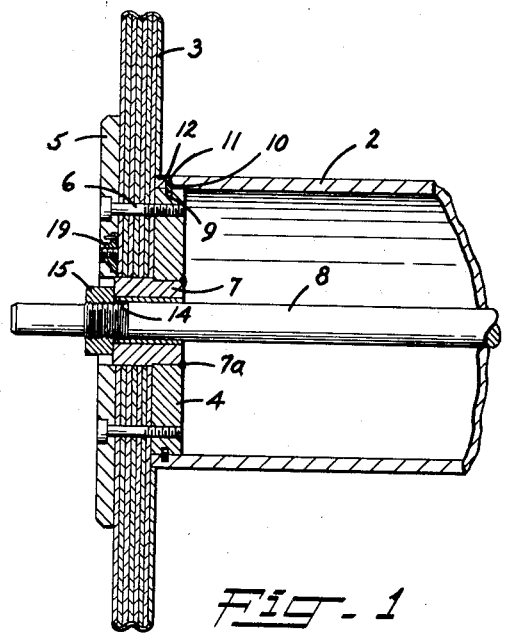

Oct. 30, 1951  E. K. BAUER  2,572,905
WARP BEAM
Filed July 1, 1946

INVENTOR.
ERNEST K. BAUER
BY
Thomas R. O'Nally

Patented Oct. 30, 1951

2,572,905

UNITED STATES PATENT OFFICE 2,572,905

WARP BEAM

Ernest K. Bauer, Meadville, Pa., assignor to American Viscose Corporation, Wilmington, Del., a corporation of Delaware Application July 1, 1946, Serial No. 680,640

7 Claims. (Cl. 242—124)

This application relates to an improved construction of spool particularly of the type required to receive heavy windings of yarns, threads, wires and the like, and it is particularly concerned with an improved construction of warp beam.

It is an object of the present invention to provide a light-weight spool having a barrel comprising a one-piece metal tube and having reinforced flanges separately secured to the tube. The specific objects, advantages and improvements in construction are more particularly shown and described hereinafter.

In the drawing, which is illustrative of the invention—

Figure 1 is a longitudinal cross-section through the left end of a preferred embodiment of the invention, Figure 2 is a longitudinal cross-section through the right end of another embodiment of the invention, Figure 3 illustrates a modification of the shaft mounting, and Figure 4 illustrates a second modification of shaft mounting.

As shown in Figure 1, the spool construction is illustrated specifically in the production of warp beams. The beam comprises a barrel formed of a one-piece tube 2, which is preferably of metal, such as a steel alloy, or a light-weight alloy of magnesium or aluminum. The ends of the tube abut against flanges 3 which are preferably of a light-weight material such as a plywood. The flanges are clamped between inner and outer metal reinforcing plates 4 and 5, such as by means of the cap screws 6. Preferably, the outer reinforcing plate 5 is considerably greater in diameter than that of the tube. The flange structure comprises a central bearing 7 adapted to receive a readily removable shaft 8. This inner bearing 7 may be formed integrally with the inner reinforcing member 4 or it may be welded therein as shown at 7a. The inner reinforcing member 4 preferably has a substantial bearing surface adapted to fit within the internal periphery of the tube 2 and at this portion it is secured to the tube, such as by welding or by keying, as shown.

The keying is accomplished by providing the annular grooves 9 and 10 in the members 4 and the tube 2 respectively and supplying these substantially aligned grooves with an annular split ring 11 of resilient character. When utilizing this keying arrangement, assembling may be accomplished by first securing screws 6 rather loosely and then holding the ring 11 within the groove 9 of the reinforcing member 4 while the flange structure is forced into the end of the tube until groove 9 registers with groove 10 and the ring 11 expands into the groove 10. Thereafter, the screws 6 are tightened to clamp the flange structure as well as to make a tight keying relationship between the flange structure and the tube. Alternatively, ring 11 is slipped onto member 4. Then members 4 and 11 only are inserted into tube 2 by temporarily compressing snap ring 11. When ring 11 is in place the flange 3 and other parts may be mounted. Preferably, as shown, the flange 3 is provided with a shallow recess 12 to receive the tube 2 and reinforcing member 4. However, this recess may be omitted if desired.

As shown in Figure 2, the members 4 may be welded in the end of tube 2 as at 7b and/or the flange proper 3 as well as the outer reinforcing member 5 may be clamped in place by the cap screws 6a. In order to reduce the stress placed by screws 6a on the weld between tube 2 and member 4, the screws preferably engage threads in opposed recesses 9a and 10a within the outer periphery of member 4 and inner periphery of tube 2 respectively, thereby keying the tube and member 4 together at a plurality of positions circumferentially of the member 4.

As shown in Figures 1 and 2, the removable shaft 8 extends completely through the beam structure and has a hexagonal head 13 secured near one end thereof and is provided with a threaded section 14 near the other end. A nut 15 serves to maintain the shaft in place.

In Figure 3, a mounting is shown in which the single long shaft is replaced by stub shafts 16 provided with flanges 17. A cap screw 18 passes through a suitable bore in the flange 17 and is secured to the reinforcing plate 5 by means of the internally threaded lug 19 set therein.

In Figure 4, a modification is shown in which a drive gear 20 provided with a stub shaft 21 is secured to one end of the beam and a guiding roller 22 carried by a stub shaft 23 is secured to the other end of the beam by means of similar cap screws 18 fitting in the lugs 19.

The tube 2 preferably is made of light-weight metal as indicated hereinabove or plastic material. It may be made quite thin, if desired, by providing it with internal reinforcement, such as longitudinal or peripheral ribs or bracing webs. Preferably, the flanges are of plywood, though they may be made of a light-weight metal and in such event they can be made considerably thinner than shown relative to the other parts of the construction.

The construction herein provided has numerous advantages. For example, the use of a one-piece tube of extruded metal or plastic provides a smooth base upon which to build the winding and such base is not as susceptible to the acquisition of irregularities through warping, distortion and the like as in the case of barrels formed of built-up structures, such as from staves of wood or the like. When using plywood flanges, a considerable saving in weight is made and the outer reinforcing plate having a diameter greater than that of the tube makes such utilization possible in spite of the great pressure exerted by heavy windings formed between the flanges. The assembly forms a rigid unit with or without the shaft in position, adapting the spool or beam to operation with stub shafts, as shown in Figures 3 and 4. A considerable saving in weight is also obtained by clamping each flange structure separately, thereby eliminating clamping rods which extend through the entire length of the beam. When plywood flanges and the keys 11 formed of expansion rings are used (as in Figure 1) or bolts 6a engage recesses 10a of the tube 2 (as in Figure 2), the clamping of the flange structure also serves to clamp the end of the tube 2 against the flange, this action occurring as a result of the compressibility of the material of which the flanges proper are made. The outer reinforcing plate 5 as well as the flange proper can be readily removed by loosening the clamping screws 6, thereby facilitating replacement of these parts in case of damage.

Changes and modifications may be made without departing from the spirit and scope of the invention as defined in the appended claims.

I claim:

1. A warp beam comprising a barrel formed of a one-piece tube and flange structures secured at the ends thereof, said flange structures each comprising a flange proper clamped between inner and outer reinforcing members, the inner reinforcing member having its outer periphery fitting snugly within the tube, approximately aligned annular grooves in the opposed surfaces of said inner reinforcing member and tube, an expansion ring disposed in said grooves for securing the tube to the flange structure, and each flange structure having a centrally disposed bearing adapted to receive a removable shaft.

2. A warp beam comprising a barrel formed of a one-piece tube and flange structures secured at the ends thereof, said flange structures each comprising a flange proper clamped between inner and outer reinforcing members, the inner reinforcing member having its outer periphery fitting snugly within the tube, a plurality of pairs of opposed axial recesses internally threaded and disposed in the opposed surfaces of said inner reinforcing member and tube, a screw in each pair of opposed recesses for securing the tube to the flange structure, and each flange structure having a centrally disposed bearing adapted to receive a removable shaft.

3. A warp beam comprising a barrel formed of a one-piece tube and flange structures secured at the ends thereof, said flange structures each comprising a flange proper clamped between inner and outer reinforcing members, the inner reinforcing member having its outer periphery fitting snugly within the tube, approximately aligned annular grooves in the opposed surfaces of said inner reinforcing member and tube and an expansion ring disposed in said grooves for securing the tube to the flange structure, said outer reinforcing member having a greater diameter than the diameter of the tube, and each flange structure having a centrally disposed bearing adapted to receive a removable shaft.

4. A warp beam comprising a barrel formed of a one-piece tube of metal and flange structures secured at the ends thereof, said flange structures each comprising a flange proper of plywood clamped between inner and outer reinforcing members of metal, the inner reinforcing member having its outer periphery fitting snugly within the tube, approximately aligned annular grooves in the opposed surfaces of said inner reinforcing member and tube and an expansion ring disposed in said grooves for securing the tube to the flange structure, said outer reinforcing member having a greater diameter than the diameter of the tube, and each flange structure having a centrally disposed bearing adapted to receive a removable shaft.

5. A warp beam comprising a barrel formed of a one-piece tube of metal and flange structures secured at the ends thereof, said flange structures each comprising a flange proper of plywood clamped between inner and outer reinforcing members of metal, the inner reinforcing member having its outer periphery fitting snugly within the tube, approximately aligned annular grooves in the opposed surfaces of said inner reinforcing member and tube and an expansion ring disposed in said grooves for securing the tube to the flange structure, said outer reinforcing member having a greater diameter than the diameter of the tube, and each flange structure having a centrally disposed bearing adapted to receive a removable shaft, means for clamping the flange proper between the inner and outer reinforcing members, said means serving also by virtue of the compressibility of the flange proper to clamp the tube tightly to the flange structure.

6. A warp beam comprising a barrel formed of a one-piece tube and flange structures secured at the ends thereof, said flange structures each comprising a flange proper clamped between inner and outer reinforcing members, the inner reinforcing member having its outer periphery fitting snugly within the tube, recesses in the peripheral walls of the inner reinforcing members, recesses in the internal wall of the tube disposed opposite the first-mentioned recesses, separate keying means engaging each pair of the opposed recesses for securing each flange structure to the tube, said outer reinforcing member having a greater diameter than the diameter of the tube, and each flange structure having a centrally disposed bearing adapted to receive a removable shaft.

7. A warp beam comprising a barrel formed of a one-piece tube of metal and flange structures secured at the ends thereof, said flange structures each comprising a flange proper of plywood clamped between inner and outer reinforcing members of metal, the inner reinforcing member having its outer periphery fitting snugly within the tube, recesses in the peripheral walls of the inner reinforcing members, recesses in the internal wall of the tube disposed opposite the first-mentioned recesses, separate keying means engaging each pair of the opposed recesses for securing each flange structure to the tube, said outer reinforcing member having a greater diameter than the diameter of the tube, and each flange structure having a centrally disposed bearing adapted to receive a removable shaft.

ERNEST K. BAUER.

REFERENCES CITED

The following references are of record in the file of this patent:

UNITED STATES PATENTS

| Number | Name | Date |
|---|---|---|
| 597,017 | Parks | Jan. 11, 1898 |
| 1,875,068 | Malby | Aug. 30, 1932 |
| 1,994,612 | Kiefer et al. | Mar. 19, 1935 |
| 2,148,394 | Thornton | Feb. 21, 1939 |
| 2,163,685 | Howsam | June 27, 1939 |
| 2,353,216 | Bodden | July 11, 1944 |
| 2,426,464 | Menking | Aug. 26, 1947 |